Figure 1:
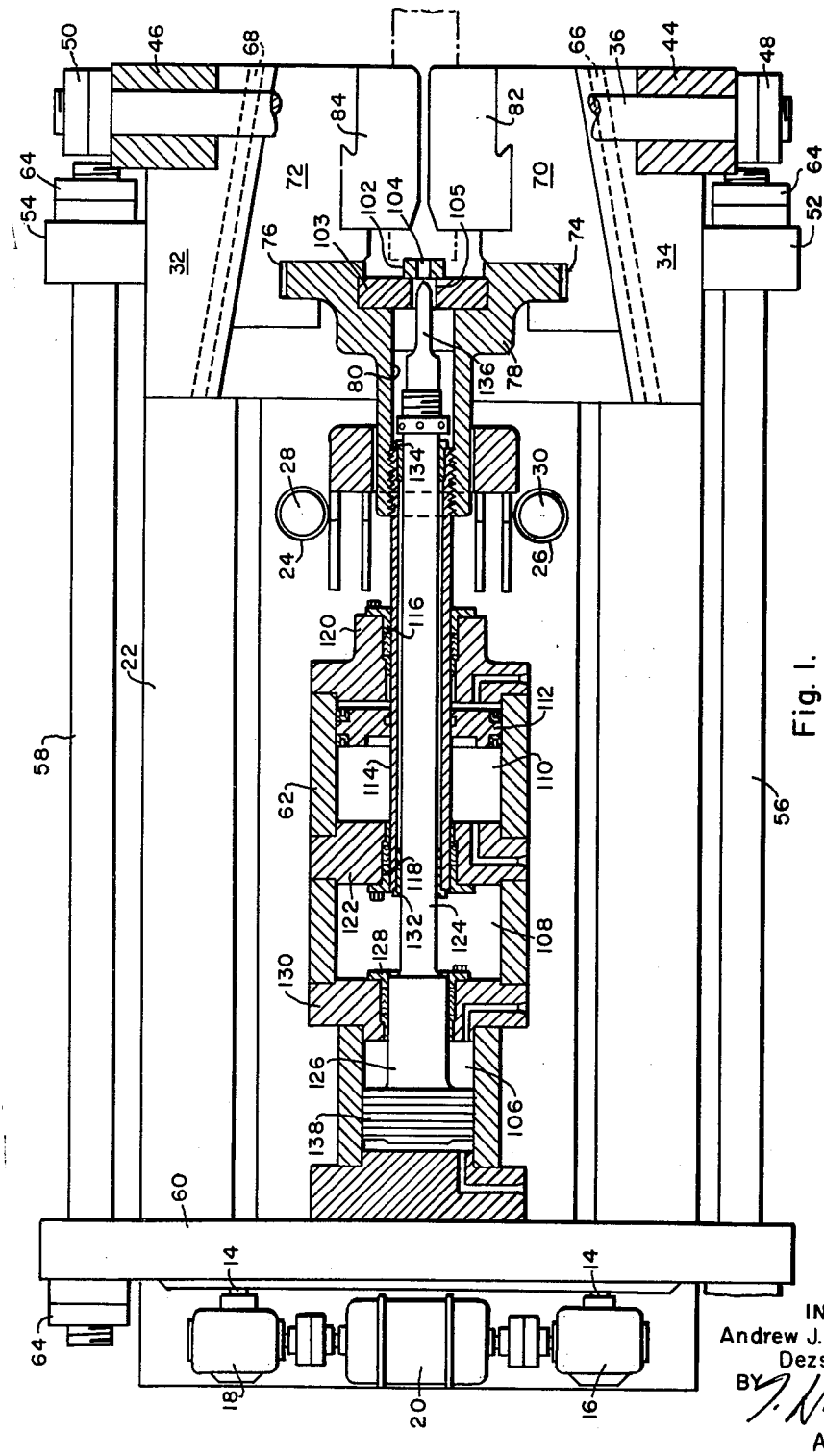

Oct. 23, 1962     A. J. SOFRANKO ET AL     3,059,509
BILLET CENTER PUNCHING APPARATUS
Filed April 19, 1960     4 Sheets-Sheet 1

INVENTORS
Andrew J. Sofranko and
Dezso Dery.
BY
ATTORNEY

Oct. 23, 1962 A. J. SOFRANKO ET AL 3,059,509
BILLET CENTER PUNCHING APPARATUS
Filed April 19, 1960 4 Sheets-Sheet 3

INVENTORS
Andrew J. Sofranko and
Dezso Dery.
BY
ATTORNEY

Oct. 23, 1962  A. J. SOFRANKO ET AL  3,059,509
BILLET CENTER PUNCHING APPARATUS
Filed April 19, 1960  4 Sheets-Sheet 4

INVENTORS
Andrew J. Sofranko and
Dezso Dery.
BY
ATTORNEY

United States Patent Office 3,059,509
Patented Oct. 23, 1962

3,059,509
BILLET CENTER PUNCHING APPARATUS
Andrew J. Sofranko, Canfield, and Dezso Dery, Hubbard, Ohio, assignors to Lombard Corporation, Youngstown, Ohio, a corporation of Ohio
Filed Apr. 19, 1960, Ser. No. 23,244
9 Claims. (Cl. 78—9)

This invention relates to apparatus for punching or forging a centering hole in the end of a metal workpiece, and more particularly to apparatus of the type described for punching centering holes in the ends of hot steel billets preparatory to a seamless tube forming operation.

In the manufacture of seamless tube, it is necessary to initially punch or forge a hole in the exact center of the end of a heated metal billet preparatory to a piercing operation. In the past, centering holes were usually formed by the use of a rapidly reciprocating pneumatic hammer which was used to drive a pointed punch into the end of a billet. During the punching operation, it was, of course, necessary to securely clamp the billet whereby its center line or axis was aligned with the hammer-driven punch, but since the force imparted to the billet during each stroke of the pneumatic hammer was relatively small, the clamping apparatus could be lightweight and relatively simple.

Notwithstanding the fact that billet center punches of the type described above have proved to be satisfactory in certain cases, they are unable to produce holes of any great depth as are required in certain piercing operations. Accordingly, it is a primary object of this invention to provide new and improved billet center punching apparatus which can punch holes of exceptionally great depth into the ends of heated metal billets.

More specifically, an object of the invention is to provide a billet center punching machine in which the force for the punch is provided by means of a hydraulic cylinder. In this manner, a much greater punching pressure can be achieved over the case where a pneumatic hammer is employed, and the depth of the hole may be considerably increased.

Another object of the invention is to provide clamping apparatus for a hydraulic billet center punching machine in which clamping pressures are applied only to the sides of the billet and are increased as the force on the punch is increased. As will become apparent from the following detailed description, this object is effected by providing a pair of jaws which tend to converge against the sides of the billet as the punch is forced into its end. Thus, as the punching force is increased, the clamping pressure on the sides of the billet is likewise increased with the result that the billet can be securely held against movement without the necessity of a stop member at the end of the billet opposite the punch.

Still another object of the invention is to provide a billet center punching machine in which the means for actuating the punch is combined with the means for actuating the billet holding jaws of the apparatus into a single hydraulic cylinder arrangement. In accordance with this aspect of the invention, the billet holding jaws are actuated by a reciprocable slide block; and this slide block is, in turn, controlled by a first hydraulic cylinder which is coaxial with the central axis of the jaws. The piston rod of the first hydraulic cylinder is tubular and receives the piston rod of a second hydraulic cylinder located directly behind the first cylinder and coaxial therewith. The piston rod of the second cylinder carries a pointed punch at its forward end, the arrangement being such that the punch may be forced into the center of the end of a billet held within the jaws. As will be seen, this arrangement facilitates a compact actuating hydraulic cylinder structure for the apparatus requiring a minimum number of parts.

Figure 2:
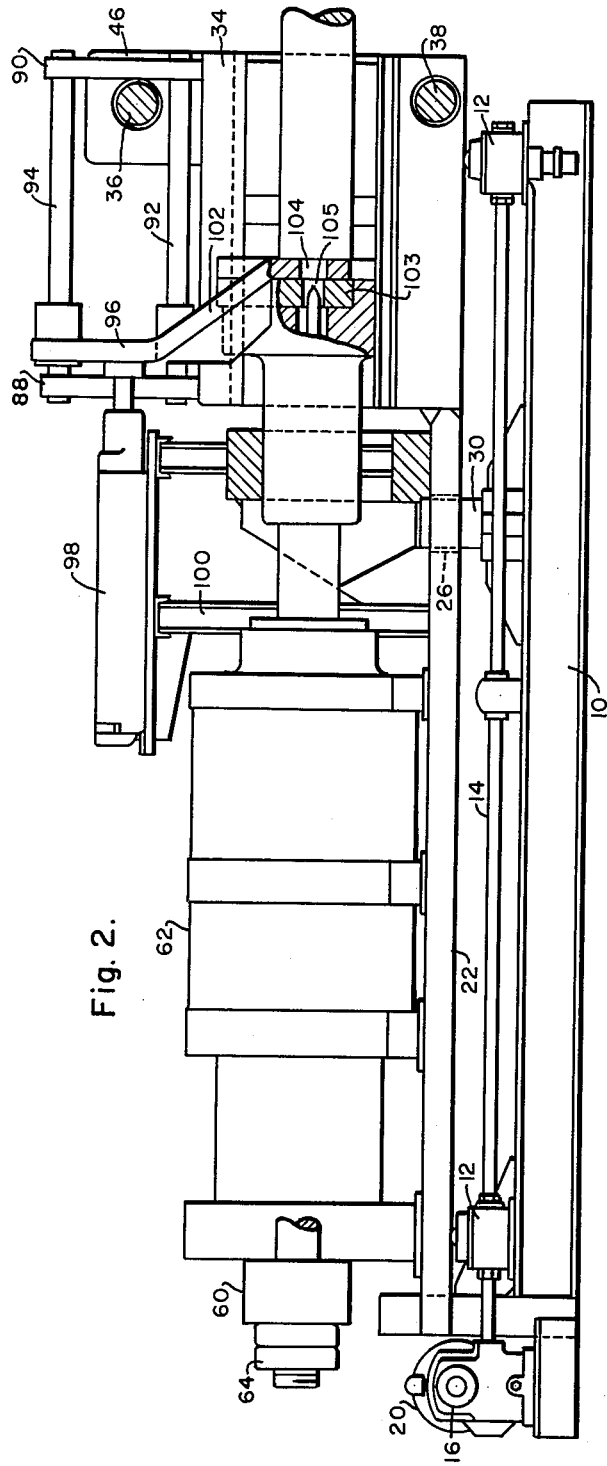
Figure 3:
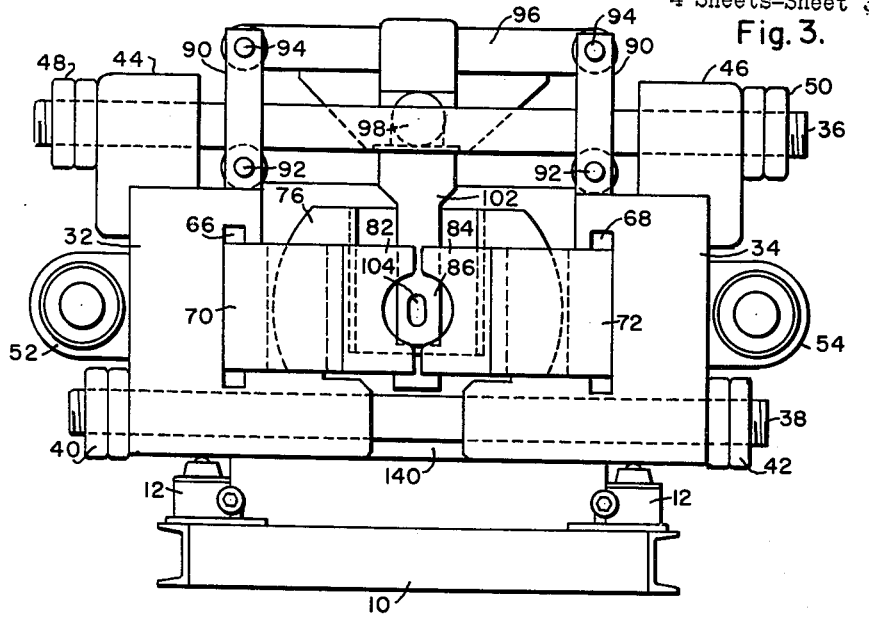
Figure 4:
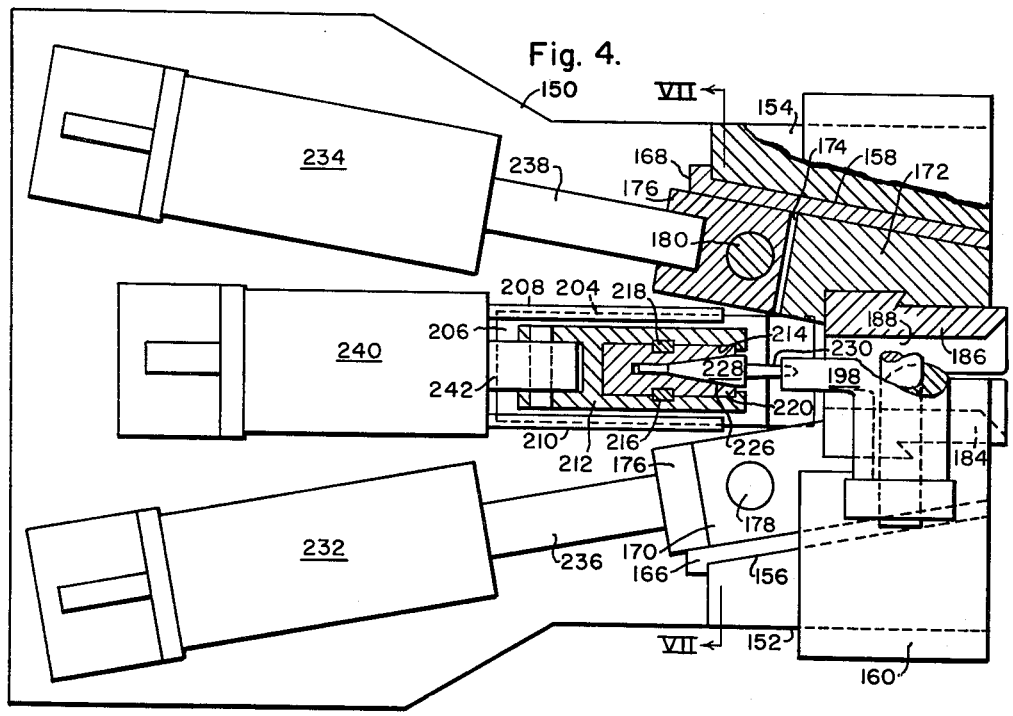
Figure 5:
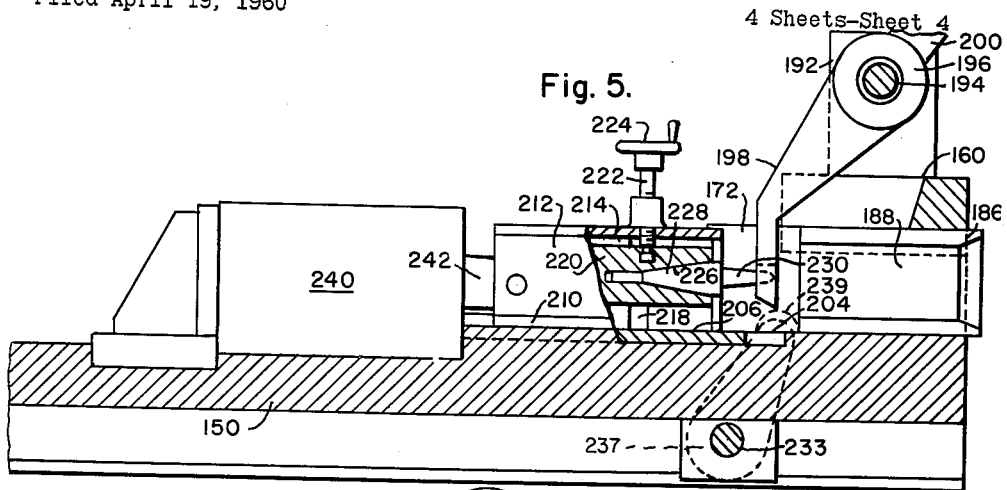
Figure 6:
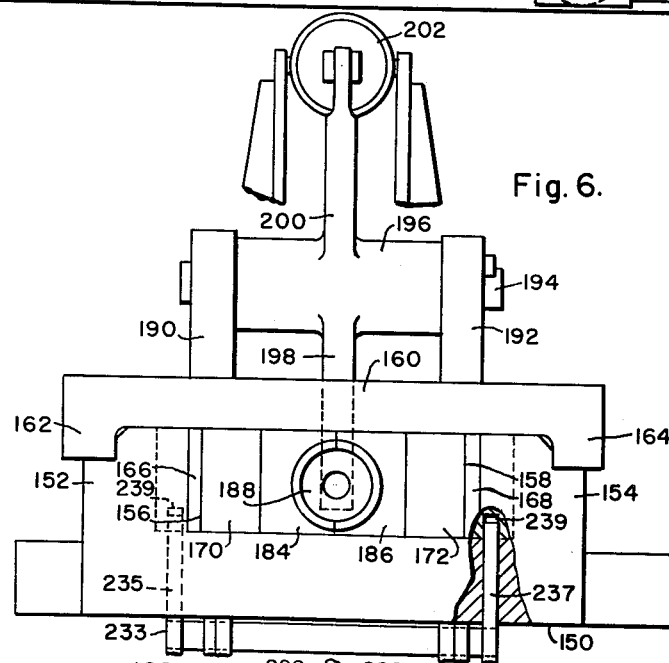
Figure 7:
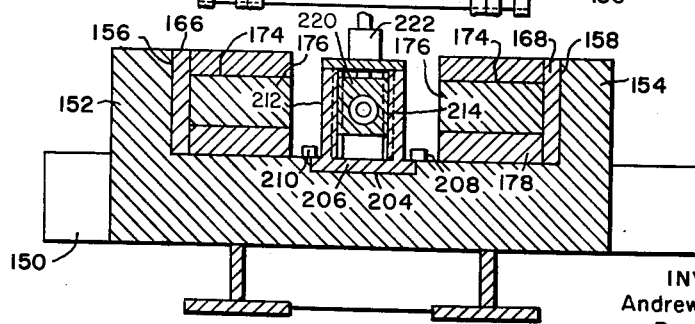

The above and other objects and features of the invention will become apparent from the following detailed description taken in connection with the accompanying drawings which form a part of this specification and in which:

FIG. 1 is a partially broken-away top view of one embodiment of the invention;
FIG. 2 is a partially broken-away side view of the embodiment shown in FIG. 1;
FIG. 3 is an end view of the embodiment of the invention shown in FIGS. 1 and 2;
FIG. 4 is a partially broken-away top view of another embodiment of the invention;
FIG. 5 is a partially broken-away side view of the embodiment of the invention shown in FIG. 4;
FIG. 6 is an end view of the embodiment of the invention shown in FIGS. 4 and 5; and
FIG. 7 is a cross-sectional view taken along line VII—VII of FIG. 4.

Referring to FIGS. 1, 2 and 3, the embodiment of the invention shown includes a base structure 10 supported at floor level. The base structure may be fabricated from welded steel channels or the like and supports jacks 12 at its four corners. As is best shown in FIG. 2, the jacks 12 are driven by worm gears connected to a shaft 14, the shaft, in turn, being connected through gear reducer 16 or 18 (FIG. 1) to a motor 20. Supported on the jacks 12 is a flat table member 22 having a pair of circular apertures 24 and 26 therein which receive cylindrical columns 28 and 30 respectively. As shown, the columns 28 and 30 are supported on base member 10 and permit the table 22 to move upwardly or downwardly while preventing transverse displacement of the same.

Welded to the forward end of table 22 are a pair of separated, C-shaped blocks 32 and 34 (FIG. 3) which are interconnected by means of transversely extending columns 36 and 38. The column 38 extends through bores provided in the lower portions of the blocks 32 and 34 and is provided with threaded ends which receive nuts 40 and 42. The column 36, on the other hand, extends through bores provided in blocks 44 and 46 which are welded or otherwise securely fastened to the tops of blocks 32 and 34 respectively. As was the case with column 38, the ends of column 36 are threaded to receive nuts 48 and 50. As will be understood, nuts 40, 42, 48 and 50 are tightened to place the columns under tension and thereby counteract any tendency of the blocks 32 and 34 to spread apart.

Secured to the sides of blocks 32 and 34 are projections 52 and 54 having bores therein for the reception of longitudinally extending columns 56 and 58. The opposite ends of the columns 56 and 58 extend through a cross bar 60 which is secured to the end of a hydraulic cylinder assembly 62. As shown, the cylinder assembly 62 is securely fastened to the table member 22, and the ends of columns 56 and 58 are threaded to receive nuts 64 whereby the combination of blocks 32 and 34, the table 22, and the cylinder assembly 62 comprise an integral rigid structure.

As can best be seen from FIGS. 1 and 3, the sides of blocks 32 and 34 which face each other converge at the forward end of the apparatus and are provided with slots 66 and 68 for the reception of a pair of gripping jaws 70 and 72 respectively. The arrangement is such that upon forward movement of the gripping jaws 70 and 72, the same are caused to converge while upon rearward movement they are caused to diverge. Each of the gripping jaws 70 and 72 is provided with a transverse slot 74 or 76, respectively, in its upper surface (FIG. 1) for the reception of transverse arm portions of a slide block 78 which has a centrally disposed bore 80 extending therethrough. The sides of gripping jaws 70 and 72 which face each other are slotted to receive inserts 82 and 84. As best shown in FIG. 3, the sides of the inserts facing each other are provided with semi-circular recesses which form a billet-receiving chamber 86 therebetween. By clamping the inserts 82 and 84, the size of the chamber 86 may be varied to accommodate different-sized billets or those of different cross-sectional configurations.

Extending upwardly from the forward and rearward edges of each of the blocks 32 and 34 are a pair of plates 88 and 90. Extending between these plates, at the upper and lower portions thereof, are a pair of rods or columns 92 and 94 which receive a carriage 96 for reciprocating movement. The carriage 96, in turn, is connected to a hydraulic cylinder 98 supported above the jaws 70 and 72 by a structure generally indicated at 100 in FIG. 2. Depending downwardly from the carriage 96 and into the space between jaws 70 and 72, at the rearward edges of the inserts 82 and 84, is a pusher arm 102 having a bore 104 extending therethrough and aligned with the central axis of the jaws 70 and 72. In the operation of the device, the end of a billet on a conveyor, not shown, is inserted into the chamber 86 while the jaws 70 and 72 are retracted into their diverging positions. After the billet is positioned between the jaws, the jaws are moved forwardly whereby they will converge to securely hold the billet therebetween. After the jaws are again diverged, or separated, the billet may be removed from the space between the jaws by actuating the cylinder 98 to force structure 96 and pusher arm 102 forwardly. This will eject the billet from between the jaws and back onto the conveyor. The pusher arm 102 is then retracted by cylinder 98 until it abuts a plate 103 disposed in a slot provided in slide block 78. As shown, the plate 103 has a centrally disposed aperture 105 therein for a purpose which will be hereinafter described.

Referring to FIG. 1, it will be noted that the hydraulic cylinder assembly 62 is divided into three separated chambers 106, 108 and 110. Reciprocable within chamber 110 is a first piston 112 connected to a tubular piston rod 114 which extends through bushings 116 and 118 in end cap 120 and annular dividing wall 122 respectively. As shown, the end of tubular piston rod 114 is threaded into the end of bore 80 extending through the slide block 78. Thus, by pressurizing the left side of chamber 110 as shown in FIG. 1, the piston 112 and piston rod 114 will be moved to the right to cause the jaws 70 and 72 to converge and clamp a billet therebetween. On the other hand, if the right side of the chamber 110 is pressurized, the piston 112 and piston rod 114 will be moved to the left to cause the jaws 70 and 72 to diverge and release a billet held therebetween. Extending through tubular piston rod 114 is a second piston rod 124 having an enlarged portion 126 slidable within a bushing 128 provided in annular dividing wall 130. The main shank portion of the piston rod 124 slides within bushings 132 and 134 provided on the inner periphery of tubular piston rod 114, and is threaded at its forward end to receive a punch 136. Integral with the enlarged diameter portion 126 is a piston 138 reciprocable within the chamber 106. Thus, if the left side of chamber 106 is pressurized as viewed in FIG. 1, the piston 138 and punch 136 will be forced to the right through apertures 105 and 104, and into the end of a hot metal billet held within the jaws 70 and 72, thereby producing a centering hole in the end of the billet. To retract the punch 136, the right side of the chamber 106 is pressurized whereby the piston 138 and punch 136 will be moved to the left.

In the operation of the device, the right ends of chambers 106 and 110 will both be pressurized whereby the punch 136 will be retracted and the jaws 70 and 72 will be moved to the left whereby they will diverge. In addition, cylinder 98 will be pressurized to retract carriage 96 whereby the pusher arm 102 will abut plate 103 in slide block 78. After the jaws 70 and 72 are diverged, the end of a billet to be punched will be inserted into the space between the jaws. The conveyor on which the billet is positioned will be located at a fixed horizontal height. This means, of course, that the center lines of billets of various diameters will be located at different vertical positions. In order to align the center line of punch 136 and the jaws 70 and 72 with the longitudinal axis of a billet, the jacks 12 may be actuated by motor 20 to raise or lower the table 22, as well as the cylinder assembly 62 and the jaws 70 and 72. When the entire structure has been elevated or lowered by jacks 12 to a position where the center line of punch 136 is aligned with the longitudinal axis of the billet on the conveyor, the end of the billet is inserted into the space between the jaws 70 and 72. Thereafter, the left end of chamber 110 is initially pressurized to force piston 112, tubular piston rod 114 and slide block 78 to the right as viewed in FIG. 1. This action causes the jaws 70 and 72 to converge on the billet and securely clamp it therebetween. After the billet is clamped in this manner, the left end of chamber 106 will be pressurized to move piston 138, piston rod 124 and ram 136 to the right whereby the ram will be forced into the end of the billet at the center thereof. It will be noted that as the pressure on ram 136 increases, the billet held between jaws 70 and 72 will tend to be ejected therefrom, but at the same time the jaws 70 and 72 tend to further converge by virtue of the fact that high frictional forces exist between the inserts 82 and 84 and the billet. Thus, the higher the punching pressure, the greater the force or pressure on the sides of the billet tending to hold it in position.

After a hole has been punched into the end of the billet, the right side of chamber 106 is pressurized whereby the ram 136 will be retracted. At the same time, the right end of chamber 110 is pressurized to move piston 112, piston rod 114 and slide block 78 to the left. This will cause the jaws 70 and 72 to diverge and release the billet held therebetween. Thereafter, the cylinder 98 is pressurized to move carriage 96 to the right as shown in FIG. 2 whereby the pusher arm 102 will force the billet out of the space between the jaws and back onto the conveyor where it may be transferred to another point. By virtue of the fact that the blocks 32 and 34 are separated, any scale or the like which rubs off the hot metal billet will merely drop through opening 140 (FIG. 3) and out of the path of the moving parts of the machine.

Referring to FIGS. 4, 5, 6 and 7, the embodiment of the invention shown therein includes a base member or block 150. At one end of the base member 150, and integral therewith, are a pair of upright members 152 and 154 having converging guideways 156 and 158 thereon. Supported on the upper surfaces of the members 152 and 154 is a cross bar 160 having downwardly extending flanges 162 and 164 at its opposite ends which fit into cooperating slots in the members 152 and 154. As is best shown in FIG. 4, abutting the guideways 156 and 158 are a pair of steel wear strips 166 and 168 which receive a pair of converging gripping jaws 170 and 172. As was the case with the embodiment of the invention shown in FIGS. 1–3, the jaws 170 and 172 are provided with inserts 184 and 186 having semi-circular curved surfaces which face each other to provide a billet-receiving chamber 188. As will be understood, the jaws 170 and 172 slide on the upper surface of base member 150 when they converge or diverge along the wear strips 166 and 168.

Extending upwardly from the cross bar 160 are a pair of members 190 and 192 which carry a horizontally extending axle 194. Pivotally supported on the axle 194 is a cylindrical member 196 having a pusher arm 198 extending downwardly into the interstice between the jaws 170 and 172. Extending upwardly from the cylindrical member 196 is a lever arm 200 which is connected, as shown in FIG. 6, to a hydraulic cylinder 202, the arrangement being such that when the hydraulic cylinder is pressurized in one direction the pusher arm 198 will be rotated in a counterclockwise direction as shown in FIG. 5 to eject the billet from between the jaws 170 and 172.

As is best shown in FIG. 7, the base member 150 is provided with a slot or guideway 204 in its upper surface which extends parallel to the central axis of the jaws 170 and 172. Slidable within the guideway 204 is a plate 206 which is held within the guideway by means of metal strips 208 and 210. Positioned on the plate 206 is a block 212 having a vertically extending guideway 214 therein. The guideway 214 is provided with a pair of vertically extending keys 216 and 218 which fit into slots provided in the sides of a vertically movable block 220. As shown in FIG. 5, the block 220 may be raised or lowered within the guideway 214 by means of a lead screw 222 which may be turned by means of a hand crank 224. Machined within the block 220 along a horizontal axis is a cone-shaped bore 226 which receives a cooperating shank portion 228 of a punch tool 230. As shown, the end of the punch tool 230 is pointed and is adapted to pass through an aperture in pusher arm 198 and be forced into the center of the end of a billet held between the jaws 170 and 172.

Machined in the trailing edges of the jaws 170 and 172 are slots 174, each of which is adapted to receive a clevis 176 which is secured to its associated jaw by means of transversely extending pin 178 or 180. The jaws 170 and 172 may be caused to converge or diverge by means of hydraulic cylinders 232 and 234 respectively. As shown, each of these cylinders is connected to an associated clevis 176 on jaw 170 or 172 by means of piston rod 236 or 238. Carried beneath the base member 150 is a transversely extending axle 233 which has a pair of arms 235 and 237 keyed or otherwise securely fastened to either end. As shown, the arms 235 and 237 extend upwardly into slots 239 provided in the bottom surfaces of the jaws 170 and 172, the arrangement being such that the arms 235 and 237 will synchronize movement of the jaws and prevent any out-of-phase condition of the pistons in cylinders 232 and 234. The plate 206 may be reciprocated in slot 204 by means of a third hydraulic cylinder 240 which is connected to the block 212 by means of piston rod 242.

In the operation of the device, a billet will first be inserted into the interstice between the jaws 170 and 172 with the jaws retracted, and hand crank 224 will be turned to align the axis of punch tool 230 with the center line of the billet. After the billet is positioned between the jaws, cylinders 232 and 234 will be simultaneously pressurized to cause the jaws 170 and 172 to move along wear strips 166 and 168 and converge upon the sides of the billet. After the billet is securely clamped between the jaws, the cylinder 240 is pressurized to move block 212 and the punch tool 230 to the right as shown in FIG. 4 whereby the end of the tool will be forced into the billet to form a hole therein. Thereafter, the cylinder 240 is pressurized in the opposite direction to withdraw the punch tool, and the cylinders 232 and 234 are pressurized to cause the jaws 170 and 172 to diverge and release the billet held therebetween. Finally, the cylinder 202 (FIG. 6) is pressurized to rotate pusher arm 198 whereby the billet will be ejected from the interstice between the jaws.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. Billet center punching apparatus comprising a block member having a pair of converging guideways therein, a pair of gripping jaws arranged on said guideways for sliding travel whereby movement of the jaws in one direction will cause the jaws to converge while movement of the jaws in the opposite direction will cause them to diverge, said jaws being adapted to receive and clamp a billet in the interstice therebetween, a first hydraulic cylinder coaxial with the central axis of said jaws and having a piston reciprocable therein, a tubular piston rod operatively connecting said piston with said jaws, a second cylinder coaxial with the central axis of said jaws, a piston recprocable in said second cylinder, a piston rod connected to said latter-mentioned piston and extending through said tubular piston rod, and a punch carried on the end of the piston rod associated with said second cylinder and adapted to be forced into the end of a billet held between said jaws.

2. Billet center punching apparatus comprising a block member having a pair of converging guideways therein, a pair of gripping jaws arranged on said guideways for sliding travel whereby movement of the jaws in one direction will cause them to converge while movement in the opposite direction will cause the jaws to diverge, said jaws being adapted to receive and clamp a billet therebetween, a slide block arranged for movement along an axis generally coincident with the central axis of said pair of gripping jaws, said slide block being connected to the gripping jaws whereby movement of the slide block in one direction will cause the jaws to converge and clamp a billet therebetween while movement of the slide block in the opposite direction will cause the jaws to diverge and release a billet held thereby, a first hydraulic cylinder coaxial with the central axis of said jaws at the diverging end of said guideways and having a piston operatively connected to said slide block, centrally disposed bores extending through the piston of said first hydraulic cylinder and the slide block, a second cylinder coaxially with the central axis of said jaws and positioned at the end of said cylinder removed from the jaws, a piston reciprocable in said second cylinder and a piston rod connected to said latter-mentioned piston, said piston rod extending through the bores in said first-mentioned piston and the slide block, and a punch carried on the end of said piston rod and adapted to punch a hole in the end of a billet held by said jaws.

3. Billet center punching apparatus comprising a base member having a block member mounted at one end thereof, a pair of converging guideways in the block, a pair of gripping jaws arranged on said guideways for sliding travel whereby movement of the jaws in one direction will cause them to converge while movement in the opposite direction will cause the jaws to diverge, said jaws being adapted to receive and clamp a billet therebetween, a slide block arranged for movement along an axis generally coincident with the central axis of said pair of gripping jaws, said slide block being connected to the gripping jaws whereby movement of the slide block in one direction will cause the jaws to converge and clamp a billet therebetween while movement of the slide block in the opposite direction will cause the jaws to diverge and release a billet held thereby, a cylinder positioned on said base member in alignment with the central axis of said gripping jaws, means dividing said cylinder into three separated chambers spaced along its axis, a first piston reciprocable within the chamber nearest said gripping jaws, a second piston reciprocable within the chamber furthest removed from the gripping jaws, a tubular piston rod connected to said first piston and the slide block and extending into the intermediate chamber in said cylinder, a second piston rod connected to said second piston and extending through said tubular piston rod for sliding movement therein, a punch secured to the end of the second piston rod removed from said second piston, means for selectively pressurizing opposite sides of the first piston whereby the jaws may be made to converge or diverge independently of said punch, and means for selectively pressurizing the opposite ends of the second piston whereby the punch may be forced into an end of a billet when it is secured between said jaws.

4. The combination claimed in claim 3 and including a pusher disposed in the interstice between the jaws and positioned between a billet held by the jaws and the punch whereby the pusher may force a billet out of the jaws at the completion of a punching operation, said pusher having an aperture therein to permit the punch to pass therethrough.

5. Billet center punching apparatus comprising a base member having block means mounted at one end thereof, a pair of converging guideways in the block means, a pair of gripping jaws arranged on said guideways for sliding travel whereby movement of the jaws in one direction will cause them to converge while movement of the jaws in the opposite direction will cause them to diverge, a first hydraulic cylinder carried on said base member coaxial with the central axis of said jaws, a piston reciprocable within said first cylinder, a tubular piston rod operatively connecting said piston with said jaws, a second hydraulic cylinder carried on said base member, said second cylinder being coaxial with the central axis of said jaws and having a piston reciprocable therein, a piston rod connected to said latter-mentioned piston and extending through said tubular piston rod, a punch carried on the end of the piston rod associated with said second cylinder for forming a hole in the end of a billet held within said jaws, and means for selectively raising or lowering said base member and the jaws and cylinders carried thereby.

6. Billet center punching apparatus comprising a block member having a pair of converging guideways therein, a pair of gripping jaws arranged on said guideways for sliding travel whereby movemet of the jaws in one direction will cause the jaws to converge while movement in the opposite direction will cause the jaws to diverge, a first hydraulic cylinder positioned in general alignment with the path of travel of one of the jaws, a piston reciprocable within said first cylinder and operatively connected to said one jaw, a second hydraulic cylinder positioned in general alignment with the path of travel of the other of said jaws, a piston reciprocable within said second cylinder and operatively connected to said other jaw, a third hydraulic cylinder disposed between said first-mentioned cylinders in general alignment with the central axis of said jaws, a piston within said third cylinder, a piston rod for said last-mentioned piston, a punch operatively connected to the end of said piston rod and adapted to be forced into the center of an end of a billet positioned within said jaws, and a pusher disposed within the interstice between said jaws and adapted to eject a billet from the space between the jaws at the completion of a punching operation, said pusher being positioned between a billet held within the jaws and said punch and having an opening therein to permit the punch to pass therethrough.

7. Billet center punching apparatus comprising a block having a pair of converging guideways therein, a pair of gripping jaws arranged on said guideways for sliding travel along horizontal paths whereby movement of the jaws in one direction will cause the jaws to converge while movement in the opposite direction will cause the jaws to diverge, a first horizontally disposed hydraulic cylinder positioned in general alignment with the path of travel of one of said jaws, a piston reciprocable within said first cylinder and operatively connected to said one jaw, a second horizontally disposed hydraulic cylinder positioned in general alignment with the path of travel of the other of said jaws, a piston reciprocable within said second cylinder and operatively connected to said other jaw, a third horizontally disposed hydraulic cylinder positioned between said first and second cylinders in general alignment with the central axis of said jaws, a piston reciprocable within said third cylinder, a piston rod for said last-mentioned piston, a slide block connected to the end of said piston rod and adapted for movement along a horizontal path, vertically extending guideways in said slide block, a member adapted for vertical movement along said guideways, means for adjusting the position of said member along the guideways, and a punch carried by said last-mentioned member and adapted to be forced into the center of an end of a billet positioned within said jaws, the arrangement being such that when billets of different diameters are positioned between the jaws, the height of said member and the punch carried thereby may be adjusted whereby the punch will intersect the exact center of the billet.

8. Billet center punching apparatus comprising a block member having a pair of converging guideways therein, a pair of gripping jaws arranged on said guideways for sliding travel whereby movement of the jaws in one direction will cause the jaws to converge while movement in the opposite direction will cause the jaws to diverge, hydraulic cylinder means operatively connected to said jaws for actuating the same in synchronism whereby the jaws will always be at equal distances from a central axis to provide an interstice between the jaws which is symmetrical about said axis, a hydraulic cylinder coaxial with the axis of said jaws, a piston reciprocable within said cylinder, a punch operatively connected to said piston and coaxial with the axis of said jaws whereby the punch may be forced into the end of a billet held within said jaws at the center thereof, and a pusher disposed within the interstice between said jaws and adapted to eject a billet from the space between the jaws at the completion of a punching operation, said pusher being positioned between a billet held within the jaws and said punch and having an opening therein to permit the punch to pass therethrough.

9. A hydraulic cylinder arrangement having a pair of independently movable coaxial piston rod devices thereon comprising, in combination, an outer cylindrical chamber, means dividing said chamber into three separated compartments spaced along its axis, a first piston reciprocable within the compartment at one end of said cylindrical chamber, a second piston reciprocable within the compartment at the opposite end of said cylindrical chamber, a tubular piston rod connected to said first piston and extending into the intermediate compartment in said cylindrical chamber, a second piston rod connected to said second piston and extending through said tubular piston rod for independent sliding movement therein, means for selectively pressurizing opposite sides of the first piston, and means for selectively pressurizing the opposite sides of the second piston.

References Cited in the file of this patent

UNITED STATES PATENTS

| 1,683,661 | Felding | Sept. 11, 1928 |
| 2,215,943 | Traut | Sept. 24, 1940 |

FOREIGN PATENTS

| 863,633 | Germany | Jan. 19, 1953 |